United States Patent
Ahn et al.

(10) Patent No.: US 12,386,554 B2
(45) Date of Patent: Aug. 12, 2025

(54) MEMORY SYSTEM AND METHOD OF OPERATING THE SAME

(71) Applicant: SK hynix Inc., Gyeonggi-do (KR)

(72) Inventors: Soo Hong Ahn, Gyeonggi-do (KR);
Hyeong Soo Kim, Gyeonggi-do (KR);
Joon Seop Sim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/339,241

(22) Filed: Jun. 22, 2023

(65) Prior Publication Data

US 2024/0211169 A1    Jun. 27, 2024

(30) Foreign Application Priority Data

Dec. 21, 2022   (KR) .................. 10-2022-0180903

(51) Int. Cl.
*G06F 3/06* (2006.01)
(52) U.S. Cl.
CPC .......... *G06F 3/0658* (2013.01); *G06F 3/0607* (2013.01); *G06F 3/0689* (2013.01)
(58) Field of Classification Search
CPC .... G06F 3/0658; G06F 3/0607; G06F 3/0689; G06F 3/061; G06F 3/0659; G06F 3/0679
USPC .................................................. 711/154, 100
See application file for complete search history.

(56) References Cited

U.S. PATENT DOCUMENTS

| | | | |
|---|---|---|---|
| 2019/0212918 A1* | 7/2019 | Wang | G06F 3/0673 |
| 2021/0263673 A1* | 8/2021 | Norman | G11C 5/025 |

FOREIGN PATENT DOCUMENTS

| | | | |
|---|---|---|---|
| KR | 10-2017-0079880 A | | 7/2017 |
| KR | 10-2019-0115402 A | | 10/2019 |

* cited by examiner

*Primary Examiner* — Hosain T Alam
*Assistant Examiner* — Zubair Ahmed
(74) *Attorney, Agent, or Firm* — IP & T GROUP LLP (57) ABSTRACT

A memory system for efficiently processing data in performing a job may include a plurality of memory devices configured to store data, a main data processor configured to access the plurality of memory devices, a sub data processor group including a plurality of sub data processors each configured to access the plurality of memory devices, respectively, a host interface configured to receive, from a host, a request for a job, and a job controller configured to perform the job by using one of the main data processor and the sub data processor group depending on whether accesses to the plurality of memory devices are related to each other for the job.

14 Claims, 8 Drawing Sheets

MEMORY SYSTEM AND METHOD OF OPERATING THE SAME

CROSS-REFERENCE TO RELATED APPLICATION

The present application claims priority under 35 U.S.C. § 119(a) to Korean patent application number 10-2022-0180903 filed on Dec. 21, 2022, the entire disclosure of which is incorporated by reference herein.

BACKGROUND

1. Field of Invention

Various embodiments of the present disclosure generally relate to a semiconductor device, and more particularly to data processing in performing a job in a memory system.

2. Description of Related Art

A memory system is a semiconductor system or a semiconductor device for storing data under the control of a host. A computational memory solution (CMS) which integrates a compute express link (CXL)-based memory with a calculation function may be applied to the memory system. Accordingly, the memory system may have an increased data processing rate by not only storing data but also by performing calculation of the data.

The memory system may include a processor unit for performing the calculation function. In this case, there may be a difference in accessibility to the memory device, data access rate, etc., depending on the position of the processor unit in the memory system.

SUMMARY

Various embodiments of the present disclosure are directed to a memory system and a method of operating the memory system, which are capable of efficiently processing data in performing a job.

An embodiment of the present disclosure may provide for a memory system. The memory system may include a plurality of memory devices configured to store data, a main data processor configured to access the plurality of memory devices, a sub data processor group including a plurality of sub data processors each configured to access the plurality of memory devices, respectively, a host interface configured to receive, from a host, a request for a job, and a job controller configured to perform the job using one of the main data processor and the sub data processor group depending on whether accesses to the plurality of memory devices are related to each other for the job.

An embodiment of the present disclosure may provide for a method of operating a memory system. The method may include receiving, from a host, a request for a job, determining whether processes of data stored in a plurality of memory devices are related to each other for the job, performing the job by using one of a main data processor and a sub data processor group including a plurality of sub data processors according to a result of the determining, and providing, to the host, a result of performing the job.

An embodiment of the present disclosure may provide for a memory system. The memory system may include a plurality of memory devices, a main controller chip including a main data processor configured to access the plurality of memory devices, and a plurality of sub controller chips each including a sub data processor configured to access the plurality of memory devices, respectively, and communicate with the main controller chip through an internal interface.

An embodiment of the present disclosure may provide for a memory system including: a plurality of memory devices; a main data processor coupled to a host at a first distance; a plurality of sub data processors coupled to the host at a second distance longer than the first distance; and a job controller configured to: receive, from a host, a request associated with a job; determine whether the job is related to accesses to all of the plurality of memory devices; when it is determined that the job is related to accesses to all of the plurality of memory devices, control the main data processor to perform the job for the plurality of memory devices; and when it is determined that the job is related to an access to a memory device selected from among the plurality of memory devices, control a sub data processor corresponding to the selected memory device to perform the job for the selected memory device.

DETAILED DESCRIPTION

Specific structural or functional descriptions in the embodiments of the present disclosure introduced in this specification are only for description of the embodiments of the present disclosure. The descriptions should not be construed as being limited to the embodiments described in the specification.

Figure 1:
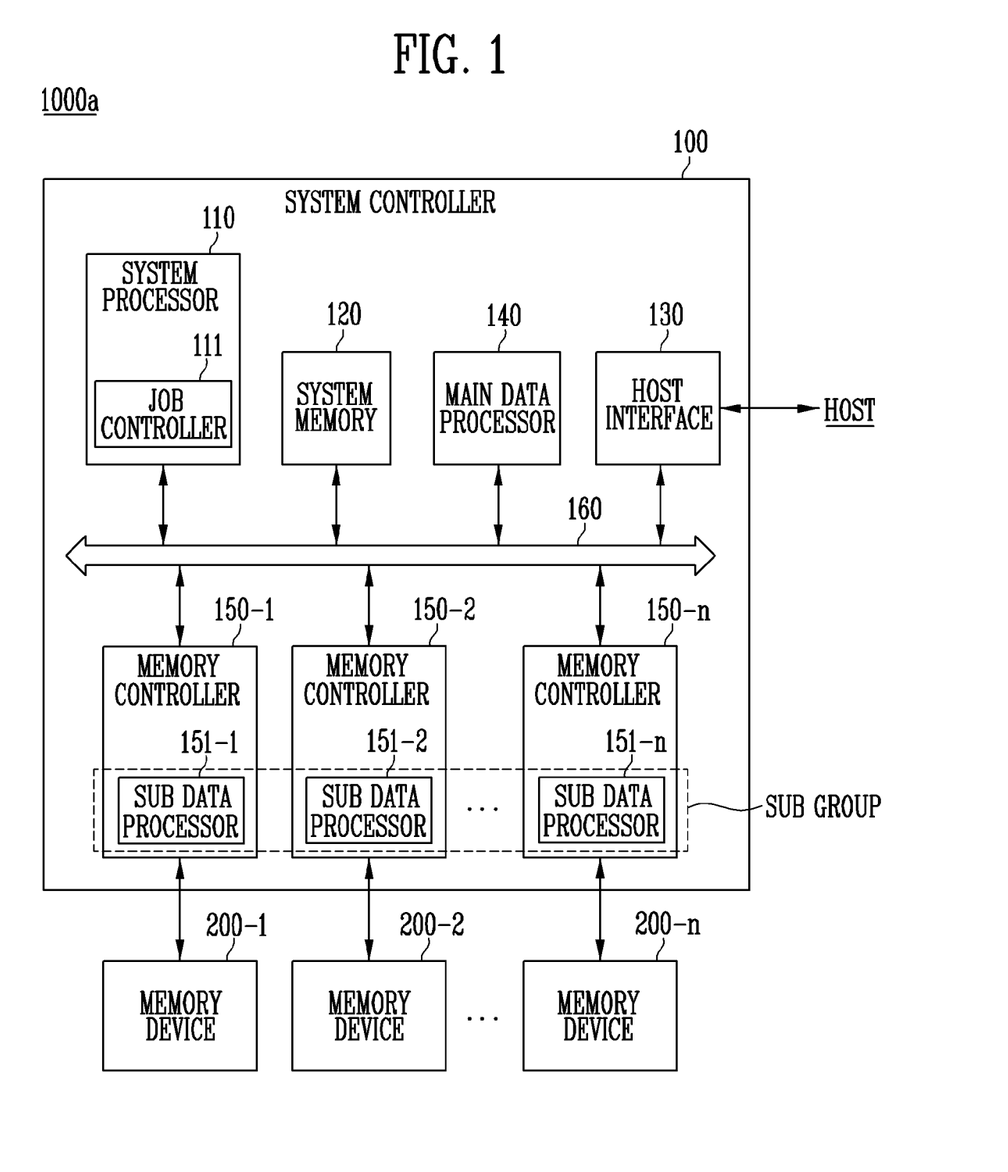
FIG. 1 is a diagram illustrating an example of a memory system according to an embodiment of the present disclosure.

FIG. 1 is a diagram illustrating an example of a memory system 1000a according to an embodiment of the present disclosure.

Referring to FIG. 1, the memory system 1000a may include a system controller 100 and a plurality of memory devices 200-1 to 200-n.

The system controller 100 may control general operation of the memory system 1000a.

In an embodiment of the present disclosure, the system controller 100 may be implemented as a system on chip (SoC).

In an embodiment of the present disclosure, the system controller 100 may include a system processor 110, a system memory 120, a host interface 130, a main data processor 140, a plurality of memory controllers 150-1 to 150-$n$, and a communication bus 160.

The system processor 110 may control operation of the system controller 100.

In an embodiment of the present disclosure, the system processor 110 may include a job controller 111.

In an embodiment of the present disclosure, the job controller 111 may determine a data processor to perform a job in response to a request for the job from a host. For example, the job controller 111 may determine a data processor to perform the job depending on whether accesses to the plurality of memory devices 200-1 to 200-$n$ are related to each other for the job.

Furthermore, the job controller 111 may control the job to be performed by using the determined data processor. In this case, the data processor may be one of the main data processor 140 and the sub data processor group SUB GROUP.

The system memory 120 may store various pieces of information required for an operation of the system controller 100 in the form of firmware.

The host interface 130 may communicate with the host. For example, the host interface 130 may receive a request for a job from the host, and provide a result of the job to the host in response to the request.

In an embodiment of the present disclosure, the request for the job may include at least one of a type of the job, query data of the job and an address of an area in which data used for the job is stored. The type of the job may include various jobs for which a calculation function of the memory system 1000$a$ is used, such as page rank, embedding, filtering, aggregation, etc. The query data of the job corresponds to various pieces of information used for the job, which may include a condition of the job, target data of the job, etc. The address may be information representing an address of a memory cell that stores data. In an embodiment, the request for the job may include various pieces of information relating to the job in addition to the aforementioned information.

The main data processor 140 may be a processor for performing the job.

In an embodiment of the present disclosure, the main data processor 140 is able to access the plurality of memory devices 200-1 to 200-$n$. For example, the main data processor 140 may read data from the plurality of memory devices 200-1 to 200-$n$ and process the data.

In an embodiment, the main data processor 140 may be located in an area of the memory system 1000$a$ adjacent to the host. For example, the main data processor 140 may have a relatively short access distance to the host, compared with a plurality of sub data processors 151-1 to 151-$n$. In this case, the access distance may refer to a physical distance, a communication distance, etc.

The plurality of memory controllers 150-1 to 150-$n$ may control the plurality of memory devices 200-1 to 200-$n$, respectively. For example, the plurality of memory controllers 150-1 to 150-$n$ may control a read operation of reading data stored in the plurality of memory devices 200-1 to 200-$n$, respectively. The plurality of memory controllers 150-1 to 150-$n$ may transmit data, a command to instruct an operation, an address, etc., to the plurality of memory devices 200-1 to 200-$n$ or receive data from the plurality of memory devices 200-1 to 200-$n$ through a memory interface (not illustrated).

In an embodiment of the present disclosure, the plurality of memory controllers 150-1 to 150-$n$ may include the plurality of sub data processors 151-1 to 151-$n$, respectively.

The plurality of sub data processors 151-1 to 151-$n$ are processors for performing a job, and may be included in a sub data processor group SUB GROUP.

In an embodiment of the present disclosure, the plurality of sub data processors 151-1 to 151-$n$ is able to access the plurality of memory devices 200-1 to 200-$n$, respectively. For example, each of the plurality of sub data processors 151-1 to 151-$n$ may read data from the accessible memory device and process the data.

In an embodiment, each of the plurality of sub data processors 151-1 to 151-$n$ may be located in an area adjacent to the accessible memory device. For example, the plurality of sub data processors 151-1 to 151-$n$ may have a relatively short access distance to the plurality of memory devices 200-1 to 200-$n$, compared with the main data processor 140.

In an embodiment, the main data processor 140 and the plurality of sub data processors 151-1 to 151-$n$ may be devices such as a near data processor (NDP), which performs various calculation operations based on the data.

The system processor 110, the system memory 120, the host interface 130, the main data processor 140 and the plurality of memory controllers 150-1 to 150-$n$ may communicate via the communication bus 160. In an embodiment of the present disclosure, the communication bus 160 may have a bandwidth wider than bandwidths allocated to the plurality of memory controllers 150-1 to 150-$n$ combined.

The plurality of memory devices 200-1 to 200-$n$ may store data. Each of the plurality of memory devices 200-1 to 200-$n$ may include a plurality of memory cells for storing data.

Figure 2:
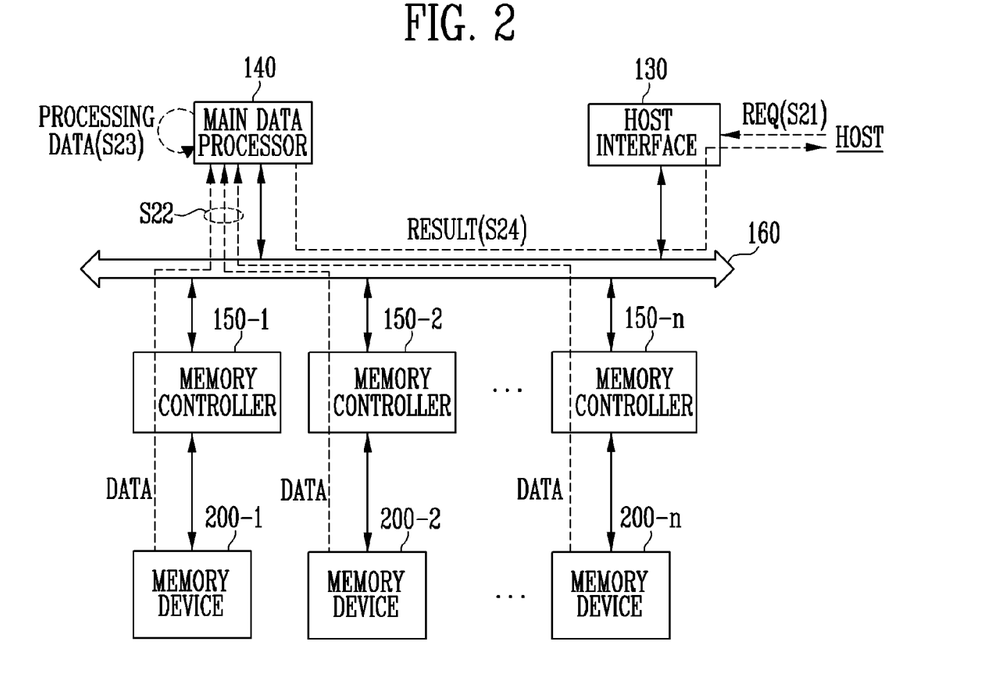
FIG. 2 is a diagram illustrating an example of performing a job by a main data processor according to an embodiment of the present disclosure.

FIG. 2 is a diagram illustrating an example of performing a job by a main data processor 140 according to an embodiment of the present disclosure.

Referring to FIG. 2, at operation S21, the host interface 130 may receive a request REQ for a job from the host. Accesses to the plurality of memory devices 200-1 to 200-$n$ are related to each other for the job, and the job may be performed by the main data processor 140. In an embodiment, the main data processor 140 may perform the job by processing data stored in each of the plurality of memory devices 200-1 to 200-$n$.

At operation S22, the main data processor 140 may read data DATA from the plurality of memory devices 200-1 to 200-$n$ through the plurality of memory controllers 150-1 to 150-$n$.

At operation S23, the main data processor 140 may process the data DATA according to the job. For example, the main data processor 140 may perform various calculation operations involved in the job based on the data read from the plurality of memory devices 200-1 to 200-$n$.

At operation S24, the host interface 130 may provide, to the host, a result RESULT of the job performed by the main data processor 140 in response to the request REQ.

In an embodiment, whether accesses to the plurality of memory devices 200-1 to 200-$n$ are related to each other for the job may correspond to whether processes of the data stored in the plurality of memory devices 200-1 to 200-$n$ are related to each other. For example, when processes of the data stored in the plurality of memory devices 200-1 to 200-$n$ are dependent on each other, accesses to the plurality of memory devices 200-1 to 200-$n$ may be related to each other. In an example, when processes of the data stored in the plurality of memory devices 200-1 to 200-$n$ are independent from each other, accesses to the plurality of memory devices 200-1 to 200-$n$ may not be related to each other.

An example in which accesses to the plurality of memory devices 200-1 to 200-$n$ are related to each other is described in detail with reference to FIGS. 3A, 3B and 4.

Figure 3A:
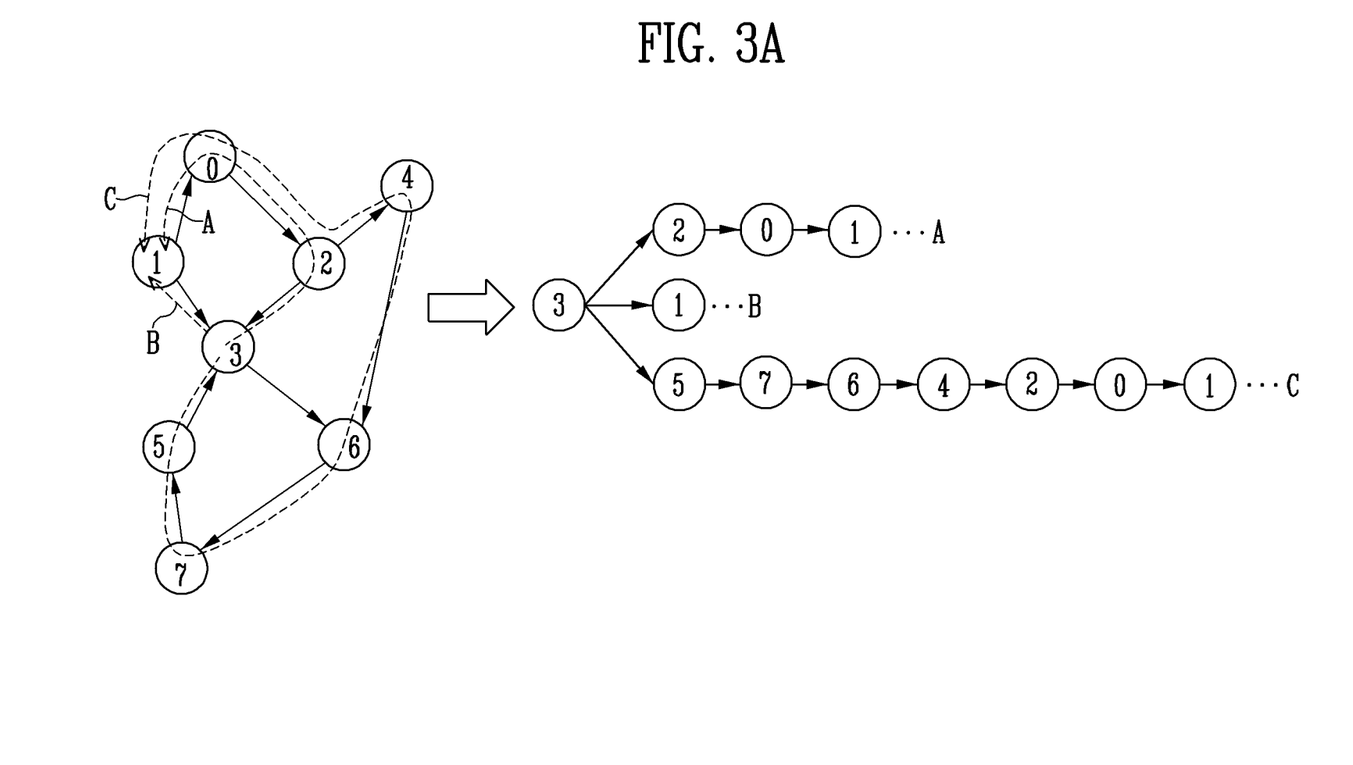
FIGS. 3A and 3B are diagrams illustrating an example in which accesses to a plurality of memory devices are related to each other for a job according to an embodiment of the present disclosure.
Figure 3B:
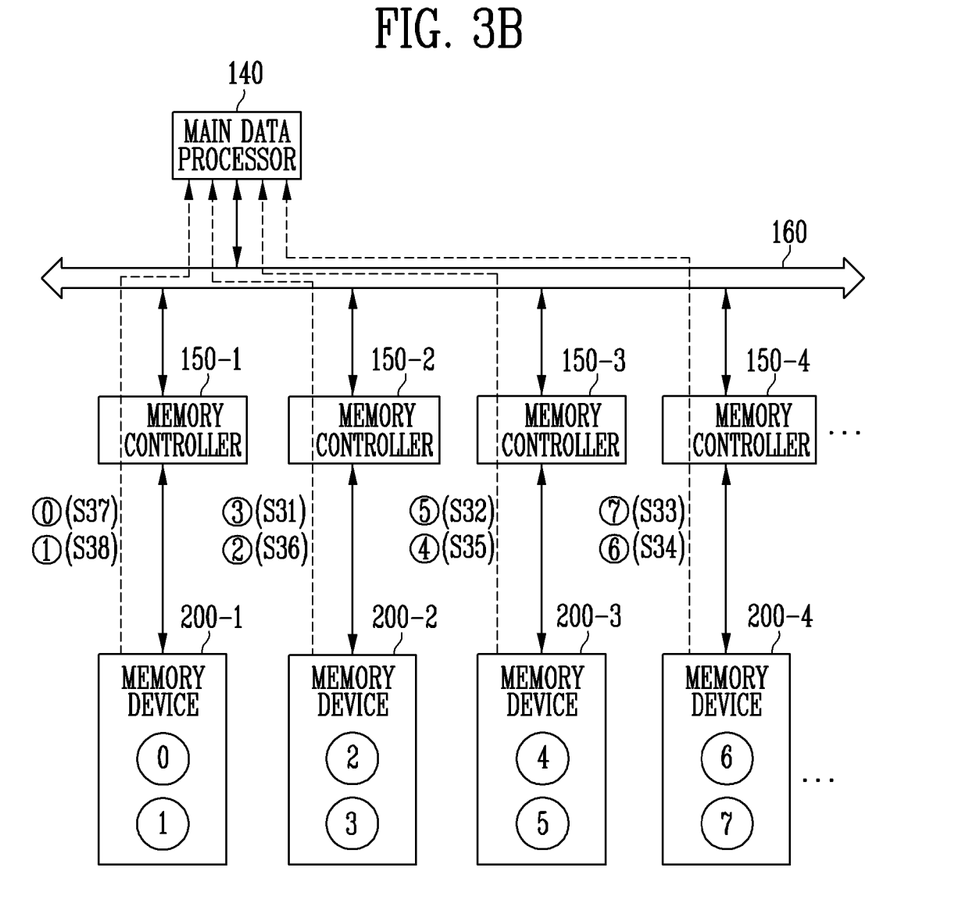

FIGS. 3A and 3B are diagrams illustrating an example in which accesses to a plurality of memory devices are related to each other for a job according to an embodiment of the present disclosure.

Referring to FIG. 3A, an example of performing one of the types of the job, i.e., page rank, is illustrated. Page rank may be an algorithm that gives a weight to a document having a hyperlink structure such as the world wide web depending on the relative importance.

What is illustrated on the left of FIG. 3A may represent a graph used for page rank. The graph may include nodes and links connecting the nodes. In FIG. 3A, there are nodes from node 0 to node 7. When a page rank calculation is performed on node 3, page rank scores for course A, course B and course C may be calculated.

What is illustrated on the right of FIG. 3A may represent a sequence in which data is processed when the page rank calculation is performed on node 3. For example, to perform the page rank calculation on node 3, data is processed in the reverse order of course A, data is processed in the reverse order of course B, and data is processed in the reverse order of course C. This may be because a data process for a node at a starting point of the link of each course is dependent on a data process for a node in an ending direction of the link. For example, in course B, a data process for node 1 may need to precede the data process for node 3. In this case, data for each node may represent a weight for the node.

Referring to FIG. 3B, an example of accessing the plurality of memory devices 200-1 to 200-$n$ to calculate a page rank score for course C of FIG. 3A is illustrated. For example, to calculate the page rank score for course C, data may be read sequentially from data for node 3 to data for node 1.

Specifically, at operation S31, the main data processor 140 may read data for node 3 from the memory device 200-2 and process the data.

At operation S32, the main data processor 140 may read data for node 5 from the memory device 200-3 and process the data. The main data processor 140 may process the data for node 5 by referring to a result of the data process for node 3.

At operation S33, the main data processor 140 may read data for node 7 from the memory device 200-4 and process the data. The main data processor 140 may process the data for node 7 by referring to a result of the data process for node 5.

At operation S34, the main data processor 140 may read data for node 6 from the memory device 200-4 and process the data. The main data processor 140 may process the data for node 6 by referring to a result of the data process for node 7.

At operation S35, the main data processor 140 may read data for node 4 from the memory device 200-3 and process the data. The main data processor 140 may process the data for node 4 by referring to a result of the data process for node 6.

At operation S36, the main data processor 140 may read data for node 2 from the memory device 200-2 and process the data. The main data processor 140 may process the data for node 2 by referring to a result of the data process for node 4.

At operation S37, the main data processor 140 may read data for node 0 from the memory device 200-1 and process the data. The main data processor 140 may process the data for node 0 by referring to a result of the data process for node 2.

At operation S38, the main data processor 140 may read data for node 1 from the memory device 200-1 and process the data. The main data processor 140 may process the data for node 1 by referring to a result of the data process for node 0.

Figure 4:
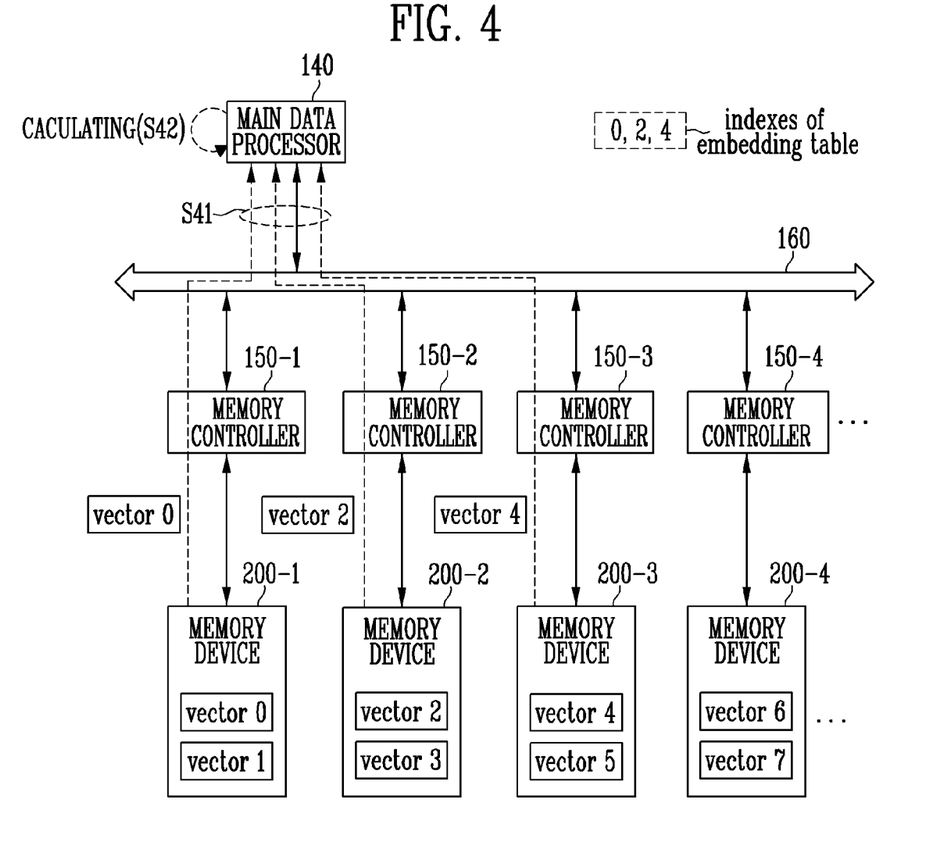
FIG. 4 is a diagram illustrating an example in which accesses to a plurality of memory devices are related to each other for a job according to an embodiment of the present disclosure.

FIG. 4 is a diagram illustrating an example in which accesses to a plurality of memory devices are related to each other for a job according to an embodiment of the present disclosure.

Referring to FIG. 4, an example of performing one of the types of the job, i.e., embedding, is illustrated. In this example, embedding may be an algorithm to change categorical data into a numerical vector.

Index 0, index 2 and index 4 in an embedding table are received from the host while receiving a request for embedding from the host. The embedding table may be a table including a plurality of embedding vectors.

At operation S41, the main data processor 140 may read an embedding vector (vector 0) corresponding to index 0 from the memory device 200-1, an embedding vector (vector 2) corresponding to index 2 from the memory device 200-2 and an embedding vector (vector 4) corresponding to index 4 from the memory device 200-3.

At operation S42, the main data processor 140 may perform an embedding calculation using the embedding vectors read (i.e., vector 0, vector 2 and vector 4). In an embodiment, embedding vectors stored in the respective memory devices are required for the embedding calculation, and thus, accesses to the plurality of memory devices 200-1, 200-2 and 200-3 may be related to each other.

Figure 5:
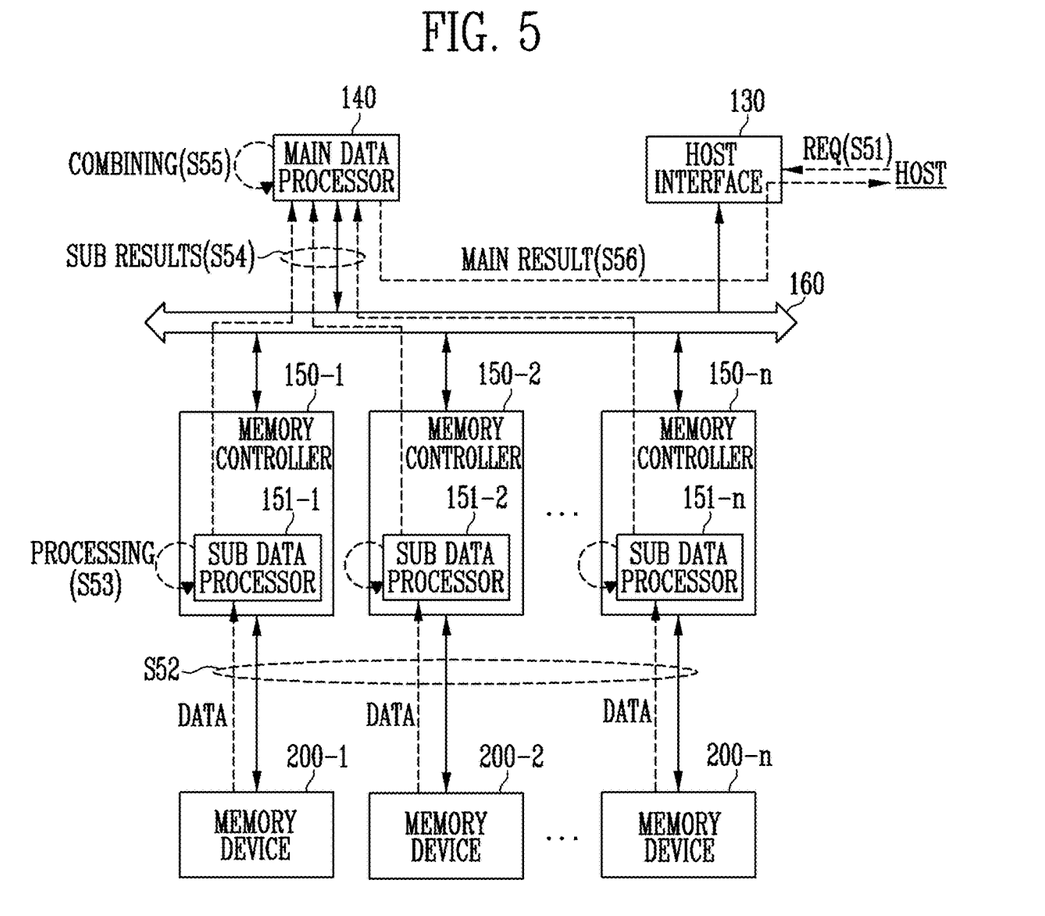
FIG. 5 is a diagram illustrating an example of performing a job by a sub data processor group according to an embodiment of the present disclosure.

FIG. 5 is a diagram illustrating an example of performing a job by a sub data processor group according to an embodiment of the present disclosure.

Referring to FIG. 5, at operation S51, the host interface 130 may receive a request REQ for a job from the host. When accesses to the plurality of memory devices 200-1 to 200-$n$ are not related to each other for the job, the job may be performed with the plurality of sub data processors 151-1 to 151-$n$. In an embodiment, the job may be divided and sent to the plurality of sub data processors 151-1 to 151-$n$. The plurality of sub data processors 151-1 to 151-$n$ may process data stored in the respectively accessible memory devices 200-1 to 200-$n$ in parallel to perform the job.

At operation S52, the plurality of sub data processors 151-1 to 151-$n$ may read data DATA from the respectively accessible memory devices 200-1 to 200-$n$.

At operation S53, the plurality of sub data processors 151-1 to 151-$n$ may process the data DATA according to the job. For example, the plurality of sub data processors 151-1 to 151-$n$ may perform various calculation operations involved in the job based on the data DATA read.

At operation S54, the main processor 140 may receive data process results SUB RESULTS from the plurality of sub data processors 151-1 to 151-$n$.

At operation S55, the main processor 140 may combine the data process results SUB RESULTS of the plurality of sub data processors 151-1 to 151-$n$ to generate a process result MAIN RESULT.

At operation S56, the host interface 130 may provide, to the host, the process result MAIN RESULT combined by the main data processor 140 in response to the request REQ.

Figure 6:
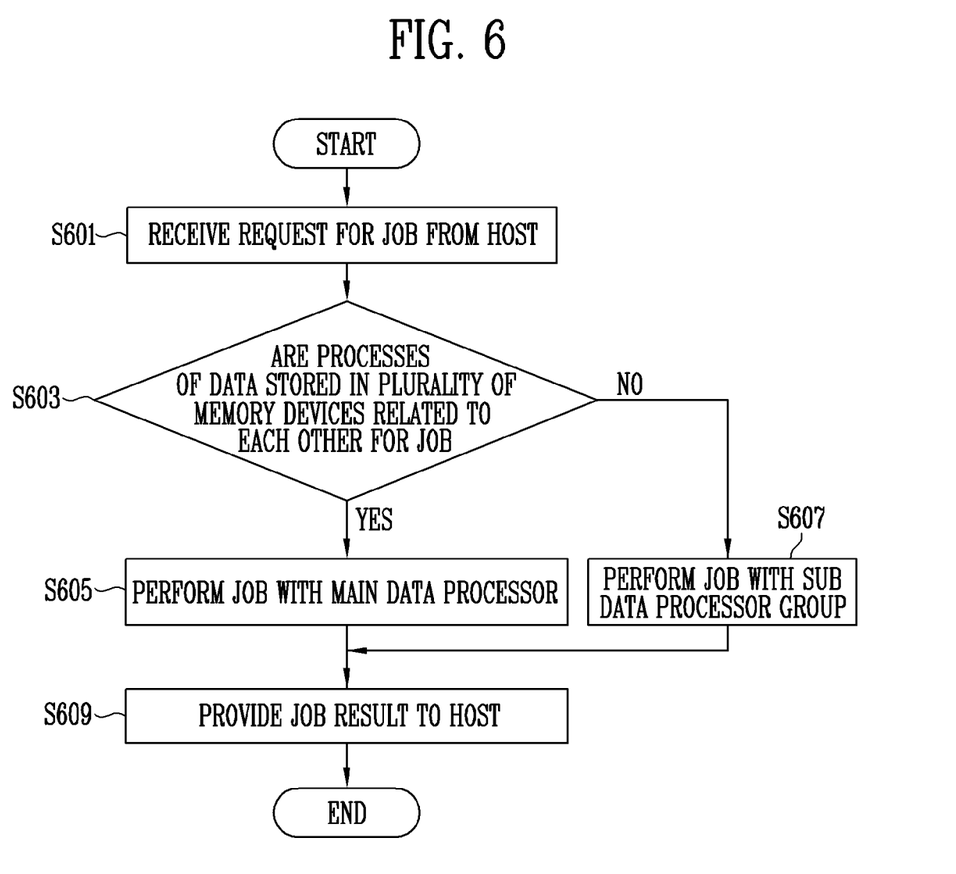
FIG. 6 is a flowchart illustrating a method of operating a memory system according to an embodiment of the present disclosure.

FIG. 6 is a flowchart illustrating a method of operating a memory system according to an embodiment of the present disclosure.

The method illustrated in FIG. 6 may be performed by the memory system 1000a illustrated in FIG. 1 or a memory system 1000b illustrated in FIG. 7, which will be described later. In the illustrated example of FIG. 6, the memory system 1000a illustrated in FIG. 1 will be described.

At operation S601, the memory system 1000a may receive a request for a job from the host.

At operation S603, the memory system 1000a may determine whether processes of data stored in the plurality of memory devices are related to each other for the job.

When it is determined that the processes of data are related to each other (S603-YES), the memory system 1000a may proceed to operation S605.

At operation S605, the memory system 1000a may perform the job with the main data processor.

When it is determined that the processes of data are not related to each other (S603-NO), the memory system 1000a may proceed to operation S607.

At operation S607, the memory system 1000a may perform the job with the sub data processor group.

At operation S609, after performing S605 or S607, the memory system 1000a may provide a result of the job to the host.

Figure 7:
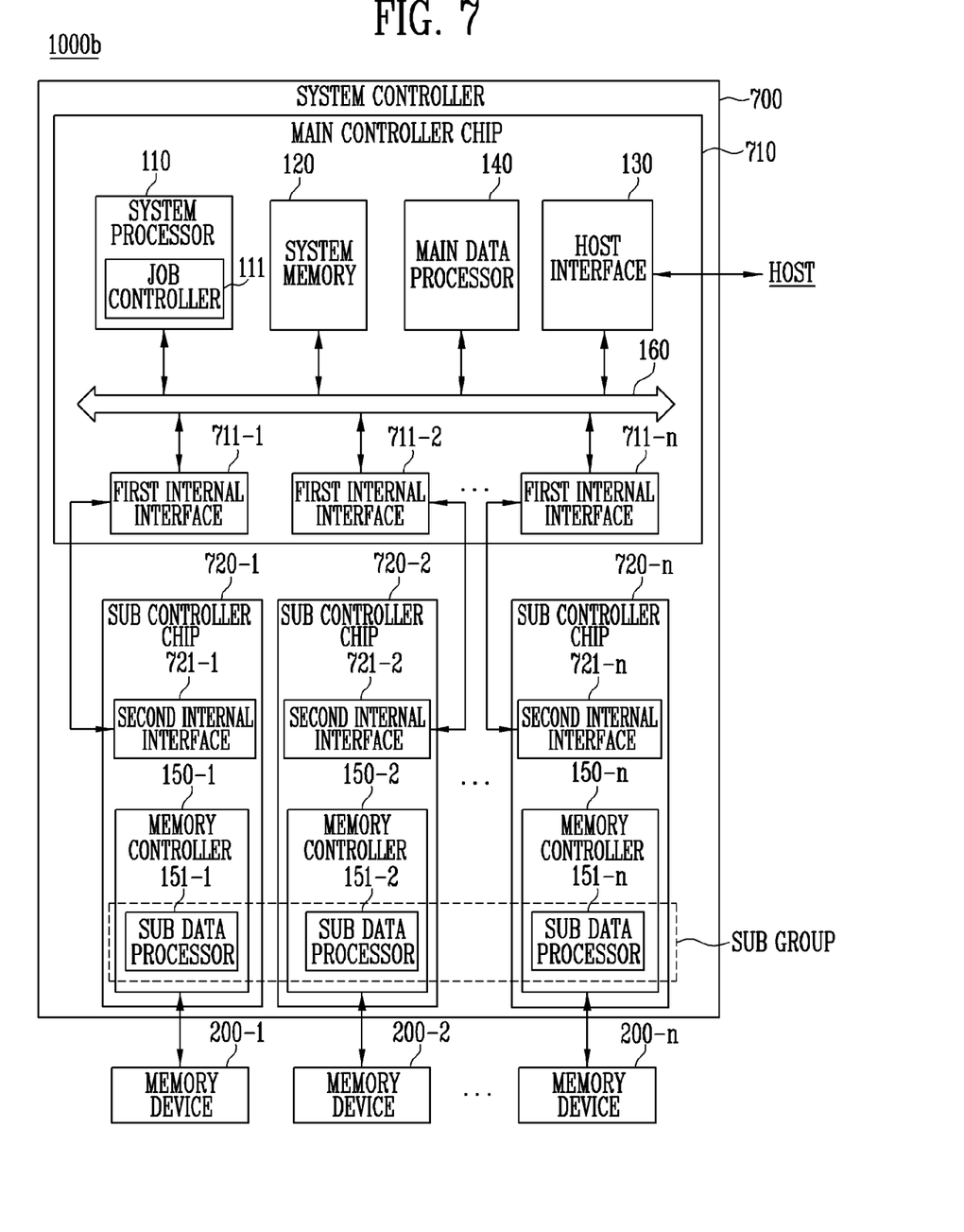
FIG. 7 is a diagram illustrating an example of a memory system according to an embodiment of the present disclosure.

FIG. 7 is a diagram illustrating an example of a memory system 1000b according to an embodiment of the present disclosure.

Referring to FIG. 7, the memory system 1000b may include a system controller 700 including the system processor 110, the system memory 120, the host interface 130, the main data processor 140, the plurality of memory controllers 150-1 to 150-n, the communication bus 160, and the plurality of memory devices 200-1 to 200-n. The aforementioned operations associated with FIG. 1 will be equally applied to the system processor 110, the system memory 120, the host interface 130, the main data processor 140, the plurality of memory controllers 150-1 to 150-n, the communication bus 160, and the plurality of memory devices 200-1 to 200-n illustrated in FIG. 7.

In an embodiment of the present disclosure, the system controller 700 may include a main controller chip 710 and a plurality of sub controller chips 720-1 to 720-n. The main controller chip 710 and the plurality of sub controller chips 720-1 to 720-n may each be implemented as a SoC.

The main controller chip 710 may include the system processor 110, the system memory 120, the host interface 130, the main data processor 140, the communication bus 160 and a plurality of first internal interfaces 711-1 to 711-n.

The plurality of sub controller chips 720-1 to 720-n may include the plurality of memory controllers 150-1 to 150-n and a plurality of second internal interfaces 721-1 to 721-n.

The main controller chip 710 and the plurality of sub controller chips 720-1 to 720-n may communicate through the plurality of first internal interfaces 711-1 to 711-n and the plurality of second internal interfaces 721-1 to 721-n.

In an embodiment of the present disclosure, the plurality of first internal interfaces 711-1 to 711-n and the plurality of second internal interfaces 721-1 to 721-n may perform communication in a serial scheme.

In accordance with the present disclosure, a memory system and a method of operating the memory system, which are capable of efficiently processing data in performing a job is provided.

Furthermore, in accordance with the present disclosure, semiconductor silicon characteristics related to routing may be improved by adding each of a main data processor and a plurality of sub data processors to a separate chip.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of this disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

What is claimed is:

1. A memory system, comprising:
    first and second memory devices configured to store data;
    first and second memory controllers configured to control the first and second plurality of memory devices, respectively, wherein the first memory controller includes a first sub data processor, the second memory controller including a second sub data processor, the first sub data processor is capable of accessing the first memory device and is not capable of accessing the second memory device, and the second sub data processor is capable of accessing the second memory device and is not capable of accessing the first memory device;
    a main data processor configured to access the first and second memory devices through the first and second memory controllers;
    a host interface configured to receive, from a host, a request for a job; and
    a job controller configured to determine that the main data processor performs the job when data stored in both the first and second memory devices is referred to perform the job, or to determine that the first sub data processor performs the job when data, which is stored in the first memory device and not in the second memory device, is referred to perform the job.

2. The memory system according to claim 1, wherein the request comprises:
    at least one of a type of the job, query data of the job and an address of an area in which data used for the job is stored.

3. The memory system according to claim 1, wherein the main data processor is configured to perform the job by processing the data stored in the first and second memory devices is referred to perform the job when the data stored in both the first and second memory devices is referred to perform the job.

4. The memory system according to claim 1, wherein the first and second data processors respectively corresponding to the first and second memory devices are configured to process data stored in respective memory devices in parallel when data stored both in the first and second memory devices is not referred to perform the job.

5. The memory system according to claim 4, wherein the main data processor is configured to combine data process results of the first and second sub data processors corresponding to the first and second memory devices.

6. The memory system according to claim 1, wherein the main data processor is configured to have a relatively short access distance to the host, compared with the first and second sub data processors.

7. The memory system according to claim 1, wherein the first and second sub data processors are respectively configured to have a relatively short access distance to the first and second memory devices, compared with the main data processor.

8. The memory system according to claim 1, wherein the host interface is configured to provide, to the host, a result of performing the job in response to the request.

9. A method of operating a memory system, comprising:
receiving, from a host, a request for a job;
determining whether data stored in first and second memory devices of a plurality of memory devices is referred to perform the job;
performing the job by using one of a main data processor and a sub data processor group including first and second sub data processors according to a result of the determining; and
providing, to the host, a result of performing the job,
wherein the first sub data processor is capable of accessing the first memory device and is not capable of accessing the second memory device,
wherein the second sub data processor is capable of accessing the second memory device and is not capable of accessing the first memory device, and
wherein the main data processor is capable of accessing both the first and second memory devices.

10. The method according to claim 9, wherein the performing comprises:
performing the job using the main data processor when it is determined that the data stored in both the first and second memory devices is referred to perform the job.

11. The method according to claim 9, wherein the performing comprises:
performing the job using the sub data processor group when it is determined that the data stored in both the first and second memory devices is not referred to perform the job.

12. A memory system, comprising:
first and second memory devices;
a main controller chip implemented as a first system on chip (SoC), and including a main data processor configured to access both the first and second memory devices and a first internal interface; and
first and second sub controller chips each implemented as a second SoC different from the first SoC, and including first and second sub data processor configured to access the plurality of memory devices, respectively, and a second internal interface configured to communicate with the first internal interface in a serial scheme, the first sub data processor being not capable of accessing the second memory device, and the second sub data processor being not capable of accessing the first memory device,
wherein the main data processor performs a job when data stored in both the first and second memory devices is referred to perform the job, and
wherein at least one of the first and second sub data processors performs the job when data stored in both the first and second memory devices is not referred to perform the job.

13. The memory system according to claim 12, wherein the main controller chip further comprises:
a host interface configured to receive a request from a host and a system controller configured to control an operation of the memory system.

14. The memory system according to claim 12, wherein each of the first and second sub controller chips is configured to control the first and second memory devices, respectively.

* * * * *